United States Patent Office 3,226,302
Patented Dec. 28, 1965

3,226,302
PRODUCTION OF BETA-CAROTENE
Alex Ciegler, Peoria, Ill., assignor to the United States of America as represented by the Secretary of Agriculture
No Drawing. Filed May 15, 1963, Ser. No. 280,755
7 Claims. (Cl. 195—28)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to an improvement in the microbiological production of beta-carotene.

More particularly this invention relates mainly to the discovery that certain materials that are presently considered as waste products from the microbiological production of beta-carotene may be substituted at negligible cost for the distinctly expensive beta-ionone additive that is widely employed for greatly enhancing the production of beta-carotene by mated cultures of *Blakeslea trispora*.

Still more particularly this invention relates to the discovery that the spent non-viable mycelia of *Blakeslea trispora* remaining from a previous fermentation process after extraction of the beta-carotene with a 1:1 mixture of pentane and hexane apparently contain poorly identifiable non-carotenoid substances that markedly stimulate the productiton of beta-carotene by *Blakeslea trispora* when added in small proportions to a fresh fermentation thereof. Another aspect of this invention is the discovery that aqueous extracts of the said waste mycelia similarly stimulate the production of beta-carotene by *Blakeslea trispora* and, to a lesser degree the discovery that substitutions for beta-ionone in the medium of other vegetative cells including those of molds and yeasts, are similarly capable of markedly enhancing the production of beta-carotene.

The principal object of this invention is the use of low cost waste product materials that can be advantageously substituted for beta-ionone in an otherwise standard fermentation medium for the production of beta-carotene by mixed strains of *Blakeslea trispora*.

Another object is the provision of a process for producing high yields of beta-carotene at lower cost than when employing beta-ionone and that incidentally provides a market for at least a portion of the large quantities of spent *Blakeslea trispora* mycelia that result from the formation of about 60 g. mycelia per liter of medium and therefore pose a substantial disposal problem to the industrial producers of beta-carotene.

In accordance with the objects of this invention I have now discovered that pentane-hexane extracted spent mycelia from a previous fermentation of *B. trispora* contain or more principles or constituents which greatly stimulate the production of beta-carotene when a small amount of the mycelia or an aqueous extract thereof is added to a fresh fermentation. Herein presented data (Table IV) conclusively demonstrate that the spent mycelia or extracts thereof act through unobvious factors not involving the supplying of carotenes and not involving the undenied supplying of the carbohydrate and the protein that per se substantially comprise the mycelial cells.

The experiments were conducted in replicate employing a uniform technique. Mating strains of *B. trispora* NRRL 9216 and NRRL 9159 were respectively transferred from potato-dextrose-agar slants to 500 ml. Erlenmeyer flasks containing 150 ml. of a sterile medium having the following composition in parts per 100 ml. of finished mediums.

Cottonseed embryo meal _____ 5
Ground whole corn _____ 2.5
Thiamine HCl _____ 0.002
Tap water, q.s. 100.

The respectively inoculated flasks were incubated at 28° C. for 48 hours on a Gump shaker operated at 200 r.p.m. Two flasks, one of each mating type, were then combined and 8 ml. portions of mixed inoculum were added under aseptic conditions to flasks containing 100 ml. of sterile basal medium having the following composition per 100 ml.

Cottonseed embryo meal _____ 5
Ground whole corn _____ 2.5
Vegetable oil (corn, soybean, or cottonseed)____ 5
Deodorized kerosene _____ 5
Nonionic detergent _____ 0.12
Thiamine HCl _____ 0.002
Tap water, q.s. 100.

The inoculated flasks (controls and the experimentals to which were also added the specific adjuncts referred to below and in the tables) were incubated at 28° C. for 6 days on a Gump shaker operating at 200 r.p.m. The mycelia were then recovered by filtration, dried in vacuo at 55° C., and the xanthophyl and beta-carotene contents determined by the standard procedures described by Anderson, et al., Jour. Agr. Food Chem., 6: 543 (1958).

PREPARATION OF ADDITIVES

Several hundred grams of *B. trispora* mycelia recovered from standard fermentations in 20-liter fermentors were exhaustively extracted in a Soxhlet apparatus with a 1:1 mixture of pentane and hexane, thus removing about 50 percent by weight of the mycelia including all of the carotenoids and the lipids. The residue recovered from the filter was dried in air at 55° C. and a portion was tested for stimulatory activity in comparison with the effect produced by similar additions of non-extracted mycelia. An aqueous extract of the pentane-hexane extracted mycelia was prepared by mixing another portion of the organic solvent extracted mycelia in 10 times its weight of water, autoclaving at 121° C. for 10 minutes, filtering, washing the residue with boiling water, and concentrating the combined liquids at 55° C. so that a 4 ml. of the final volume represented the water-solubles from 1 gm. of fat-free mycelia. The residual mycelia representing 80 percent by weight of the starting "fat-free" mycelia was air-dried at 55° C. Table I shows that organic solvent-extracted mycelia enhances carotene production to about the same extent as does the non-extracted, thus suggesting that the activity resides primarily in the non-lipid constituents of the mycelia. Table II shows the results obtained following the addition of several proportions of non-extracted mycelia, of pentane-hexane extracted *Blakeslea trispora* mycelia, a water extract prepared from the organic solvent-extracted mycelia, and the residue remaining after the water extraction. These results indicate that most of the activity is associated with the water-soluble fraction.

In order to determine the probable nature of the active constituents of the aqueous extract a portion thereof was freed of organic acids by the lead acetate precipitation method of Jorysh et al., Food Technol. 16:90 (1962) in which the insoluble lead salts of the organic acids after being washed with 80 percent ethanol are solubilized with $H_2S$, the solution filtered to remove the resulting lead sulfide, the filtrate evaporated to dryness in vacuo, the dry residue then being redissolved in water for descending paper chromatography in a butanol:formic acid:water system using bromcresol green as the indicator. Citric acid was found to be the principal constituent and was accompanied by some malic acid along with a trace of another acid having an $R_f$ similar to that of gluconic or 2-keto-gluconic acid. Table III shows that the addition of the organic acids fraction is approximately as effective as the addition of the whole aqueous extract of the fat-free mycelia.

Table III also shows that the substitution of up to 9 percent by weight of spent *Blakeslea trispora* mycelia (assaying 5.9 percent total N and 19.4 percent total sugars) for the nitrogen and carbon sources (cottonseed embryo meal and corn) does not provide a normal production of beta-carotene and thus that the mycelial effect is not the result simply of providing additional sources of nitrogen and carbohydrate.

Table IV shows the effects of adding several different proportions of spent *B. trispora* mycelia to fresh fermentations.

Although he data of Tables I–III incidentally show that the stimulatory principle can be obtained in the form of an aqueous extract of the pentane-hexane extracted *B. trispora* mycelia, it is clear that there would be no advantage to offset the cost of making such extracts of the already available spent mycelia.

Table V shows the effect of adding 1 to 2 percent of various pentane-hexane extracted mold mycelia including *B. trispora*, some of which additions consisted of one or the other of two mating strains for comparison with the effect of adding the mixed mating strains. No attempts were made to prepare extracts nor to establish the locus or the nature of the active principle.

Table VI shows the effects of adding various pentane-hexane extracted yeast cells at the start of a standard fermentation by *Blakeslea trispora*.

TABLE I.—EFFECT OF ADDING *B. TRISPORA* MYCELIUM ON CAROTENE PRODUCTION

| Adjunct | | Mycelium, g./100 ml. | Carotene yield in solids, mg./g. | Cartene yield, mg./100 ml. |
| --- | --- | --- | --- | --- |
| Type | Amount, percent | | | |
| None | | 4.88 | 10.15 | 50.5 |
| Mycelium | 1.5 | 8.13 | 12.55 | 98.3 |
| Do | 3.0 | 8.38 | 14.05 | 117.8 |
| Extracted mycelium [1] | 0.5 | 6.83 | 11.8 | 80.8 |
| Do | 1.0 | 6.48 | 16.8 | 108.4 |
| Do | 2.0 | 7.59 | 12.3 | 93.3 |

[1] Pentane-hexane extracted.

TABLE II.—EFFECT OF *B. TRISPORA* MYCELIUM AND AQUEOUS EXTRACT THEREOF ON CAROTENE PRODUCTION

| Adjunct | | Dry Mycelium, g./100 ml. | Carotene yield in solids, mg./g. | Cartene yield, mg./100 ml. |
| --- | --- | --- | --- | --- |
| Type | Amount, percent | | | |
| None | | 6.10 | 11.8 | 72.0 |
| Mycelium | 0.5 | 6.47 | 13.7 | 88.1 |
| Do | 1.0 | 6.23 | 12.5 | 77.1 |
| Extracted mycelium [1] | 0.5 | 6.13 | 13.8 | 85.0 |
| Do | 1.0 | 6.63 | 13.8 | 91.1 |
| Do | 2.0 | 7.90 | 13.7 | 107.3 |
| Water extract [2] | 2.0 | 5.40 | 14.7 | 79.3 |
| Do | 4.0 | 5.89 | 16.7 | 96.0 |
| Do | 8.0 | 5.82 | 22.5 | 130.8 |
| Residue [3] | 0.8 | 7.12 | 11.8 | 84.0 |
| Do | 1.6 | 6.54 | 12.3 | 80.5 |

[1] *B. trispora* mycelium from a previous fermentation was exhaustively extracted with pentane-hexane (B.P. 33–57° C.)
[2] The water extract was made from pentane-hexane-extracted mycelium.
[3] Mycelium extracted with pentane-hexane and water.

TABLE III

Mg. carotene per 100 ml. medium a. *B. Trispora* fermentation in standard medium (control) — 68
b. *a* with 2% addition of pentane-hexane extracted *B. trispora* mycelia — 124
c. *a* with addition of aqueous extr. of pentane-hexane extracted mycelia (corresponding to 2% mycelia based on the medium) — 129
d. *a* with addition of organic acid fraction from aqueous extract (corresponding to 2% of mycelia based on the medium) — 122
e. *a* with addition of aqueous extract of *c* from which the organic acid fraction has been removed — 85
f. *a* with addition of mycelial residue after extraction with water — 63
g. *B trispora* fermentation in medium in which the C and N sources (cotton seed embryo meal and the corn meal) have been substituted by 2% of pentane, hexane-extracted *B. trispora* mycelia — 9.7
h. Same as *g* but substituted 7% by wt. of the mycelia — 34
i. Same as *g* but substituted 9% by wt. of the mycelia — 30.6

TABLE IV.—EFFECT OF *B. TRISPORA* MYCELIUM [1] CONCENTRATION ON CAROTENE PRODUCTION

| Amount of added mycelium, g./100 ml. | Dry mycelium, g./100 ml. | Carotene yield in solids, mg./g. | Carotene yield, mg./100 ml. |
| --- | --- | --- | --- |
| None | 5.34 | 16.1 | 86.0 |
| 0.5 | 5.55 | 17.0 | 94.4 |
| 1.0 | 5.62 | 21.5 | 121.0 |
| 1.5 | 6.19 | 23.0 | 142.2 |
| 2.0 | 6.59 | 19.4 | 127.2 |
| 3.0 | 6.01 | 15.5 | 93.2 |
| 4.0 | 6.08 | 18.9 | 115.3 |
| 5.0 | 6.03 | 20.6 | 118.6 |
| 7.0 | 6.09 | 20.5 | 124.7 |
| 10.0 | 5.34 | 13.2 | 70.4 |

[1] Pentane-hexane extracted mycelium.

TABLE V.—EFFECT OF ADDING VARIOUS MOLD MYCELIA ON CAROTENE PRODUCTION BY *BLAKESLEA TRISPORA*

| Mycelial Adjuncts | | Amount, percent | Dry mycelium, g./100 ml. | Carotene yield in solids, mg./g. | Carotene yield, mg./100 ml. |
| --- | --- | --- | --- | --- | --- |
| Name | NRRL Number | | | | |
| None | | | 5.46 | 10.3 | 59.0 |
| B. trispora | 9216×9159 | 2 | 7.42 | 16.0 | 118.6 |
| B. trispora | 9216 (+) | 2 | 7.76 | 17.0 | 128.2 |
| B. trispora | 9159 (−) | 2 | 6.84 | 17.0 | 115.4 |
| Aspergillus clavatus | 2A | 2 | 6.86 | 17.7 | 117.1 |
| A. niger | 67 | 1.6 | 7.44 | 18.2 | 135.4 |
| Rhizopus acetoinus | 549 | 2 | 7.22 | 11.2 | 79.6 |
| R. chinensis | A10433 | 2 | 7.39 | 13.9 | 99.3 |
| Mucor jansseni | 553 | 2 | 6.70 | 15.3 | 102.7 |
| Blakeslea circinans | 6680 | 1 | 6.45 | 13.1 | 84.8 |
| Choanephora infundibulifera | 6325 (−) | 1 | 5.93 | 10.8 | 64.6 |
| C. infundibulifera | 6324 (+) | 1 | 6.00 | 12.0 | 72.0 |
| C. infundibulifera | 6324×6325 | 1 | 6.33 | 12.8 | 81.1 |
| C. cucurbitarum | A6097 (+) | 2 | 6.58 | 18.1 | 119.4 |
| C. cucurbitarum | A6098 (−) | 2 | 5.78 | 16.6 | 92.8 |
| C. cucurbitarum | 6097×6098 | 2 | 6.71 | 15.1 | 102.0 |

TABLE VI.—EFFECT OF VARIOUS PENTANE-HEXANE EXTRACTED YEAST CELLS ON CAROTENE PRODUCTION

| Adjuncts | | Amount, percent | Dry mycelium, g./100 ml. | Carotene yield in solids, mg./g. | Carotene yield, mg./100 ml. |
| --- | --- | --- | --- | --- | --- |
| Name | NRRL Number | | | | |
| None | | | 5.58 | 9.8 | 54.3 |
| B. trispora | 9216×9159 (Control) | 1.5 | 5.80 | 15.1 | 102.3 |
| Rhodotorula glutinus | Y-34 | 1.0 | 6.14 | 17.0 | 104.0 |
| | Y-192 | 0.87 | 6.58 | 14.0 | 91.8 |
| | Y-207 | 1.0 | 6.28 | 16.3 | 102.0 |
| | Y-842 | 0.83 | 5.87 | 18.3 | 105.6 |
| R. rubra | Y-1594 | 1.0 | 6.43 | 16.3 | 106.3 |
| R. sannei | Y-1595 | 1.0 | 5.81 | 18.3 | 106.6 |
| R. sannei | Y-1595 | 2.0 | 6.19 | 20.5 | 127.0 |
| Brewers' yeast autolysate (comm'l.) | | 1.5 | 6.0 | 21.5 | 129.1 |
| Saccharomyces cerevissiae | | 1.5 | 6.60 | 15.4 | 101.0 |

Having fully disclosed my invention, I claim:

1. A method of greatly improving the production of beta-carotene by the mixed mating strains of *Blakeslea trispora* in a beta-carotene-producing fermentation medium, comprising adding to the medium at the beginning of the fermentation a member selected from the group consisting of (a) from 1 to 2 percent by weight, based on the medium, of dry pentane-hexane extracted, fat-free mycelia of an organism selected from the group consisting of *Blakeslea trispora, Aspergillus clavatus, Aspergillus niger, Rhizopus acetoinus, Mucor jansseni, Rhizopus chinensis, Blakeslea circirans, Choanephora infudibulifera, Choanephora cucurbitarum, Rhodotorula glutinus, Rhodotorula rubra, Rhodoturula sannei,* and *Saccharomyces cerevissiae,* and (b) a concentrate of the entire aqueous extract of said fat-free mycelia containing the water-solubles from 1 gm. of said fat-free mycelia, and fermenting the resulting culture medium under aerobic conditions and at 28° C. for 6 days.

2. A method of greatly improving the production of beta-carotene by mixed mating strains of *Blakeslea trispora* in a fermentation medium of the following composition:

| | Parts |
| --- | --- |
| Cottonseed embryo meal | 5.0 |
| Ground whole corn | 2.5 |
| Vegetable oil | 5.0 |
| Deodorized kerosene | 5.0 |
| Nonionic detergent | 0.12 |
| Thiamine HCl | 0.002 |
| Tap water, q.s. ad 100. | | comprising adding to the medium at the beginning of the fermentation a member selected from the group consisting of (a) from 1 to 2 percent by weight, based on the medium, of dry, pentane-hexane extracted, fat-free mycelia of an organism selected from the group consisting of *Blakeslea trispora, Aspergillus clavatus, Aspergillus niger, Rhizopus acetoinus, Mucor jansseni, Rhizopus chinensis, Blakeslea circirans, Choanephora infundibulifera, Choanephora cucurbitarum, Rhodotorula glutinus, Rhodotorula rubra, Rhodotorula sannei,* and *Saccharomyces cerivissiae,* and (b) a concentrate of the entire aqueous extract of said fat-free mycelia, said concentrate containing the water solubles from 1 gm. of said mycelia, and fermenting in the resulting culture medium under aerobic conditions and at 28° C. for 6 days.

3. The method of claim 2 wherein the mycelia is that of *Blakeslea trispora.*

4. The method of claim 2 wherein the mycelia is that of *Aspergillus niger.*

5. The method of claim 2 wherein the mycelia is that of *Rhodotorula glutinus.*

6. The method of claim 2 wherein the mycelia is that of *Rhodotorula sannei.*

7. The method of claim 2 wherein the mycelia is that of *Saccharomyces cerivissiae.*

References Cited by the Examiner

UNITED STATES PATENTS 2,890,989  6/1959  Anderson _____ 195—28
3,085,049  4/1963  Rudy et al. _____ 195—80

A. LOUIS MONACELL, *Primary Examiner.*